(12) United States Patent
Hedlund et al.

(10) Patent No.: US 12,447,904 B2
(45) Date of Patent: Oct. 21, 2025

(54) SYSTEM FOR ATTACHING ACCESSORIES TO A SNOWMOBILE

(71) Applicant: Polaris Industries Inc., Medina, MN (US)

(72) Inventors: Michael A. Hedlund, Roseau, MN (US); Evan M. Rosemore, North Branch, MN (US); Michel E. Eaton, Roseau, MN (US); Barry A. Johnson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/326,547

(22) Filed: May 31, 2023

(65) Prior Publication Data

US 2023/0339408 A1 Oct. 26, 2023

Related U.S. Application Data

(63) Continuation of application No. 17/585,027, filed on Jan. 26, 2022, which is a continuation of application No. 16/723,834, filed on Dec. 20, 2019, now Pat. No. 11,267,407.

(51) Int. Cl.
*B60R 9/06* (2006.01)
*B60R 9/12* (2006.01)

(52) U.S. Cl.
CPC ............... *B60R 9/065* (2013.01); *B60R 9/12* (2013.01)

(58) Field of Classification Search
CPC .... B62M 2027/028; B60R 9/06; B60R 9/065; B62K 19/46; B60P 7/0807

USPC ........ 224/408, 442, 443, 447, 450, 451, 459
See application file for complete search history.

(56) References Cited

U.S. PATENT DOCUMENTS

| | | | |
|---|---|---|---|
| 3,850,353 A | 11/1974 | Foulds | |
| 4,893,692 A * | 1/1990 | Smith | B62M 27/02 180/190 |
| 5,076,191 A | 12/1991 | Madore | |
| 5,533,783 A * | 7/1996 | Harms | B62J 1/12 297/440.22 |
| 5,894,810 A | 4/1999 | Orr | |
| 6,086,149 A * | 7/2000 | Atherley | B62J 1/12 297/214 |
| 6,109,217 A | 8/2000 | Hedlund et al. | |
| 6,371,233 B2 | 4/2002 | Ishii | |
| 6,439,328 B1 | 8/2002 | Vaillancourt et al. | |
| 6,585,465 B1 | 7/2003 | Hammond et al. | |
| 6,668,742 B2 | 12/2003 | Nadeau et al. | |
| 6,722,301 B2 | 4/2004 | Nagata et al. | |

(Continued)

FOREIGN PATENT DOCUMENTS

CN 207565491 U 7/2018

OTHER PUBLICATIONS

"Ski-Doo 860200707 Glove Box Extension by Ski-Doo", webpage from the Amazon.com website, product first available for sale Jul. 31, 2016.

(Continued)

*Primary Examiner* — Adam J Waggenspack
(74) *Attorney, Agent, or Firm* — Merchant & Gould P.C.

(57) ABSTRACT

A snowmobile including: a frame including a tunnel configured to accommodate a drive track; a connector mounted to the frame over the tunnel; and a seat configured to be removably connected to the snowmobile by way of the connector.

17 Claims, 17 Drawing Sheets

(56) References Cited

U.S. PATENT DOCUMENTS

| | | | |
|---|---|---|---|
| 6,749,036 B1* | 6/2004 | Schrapp | B62M 27/02 224/408 |
| 6,920,952 B2* | 7/2005 | Bertrand | B62M 27/02 224/408 |
| 6,923,134 B1 | 8/2005 | Vrudny et al. | |
| 6,959,660 B1 | 11/2005 | Packebush | |
| 7,011,173 B2 | 3/2006 | Cadotte et al. | |
| 7,328,943 B2 | 2/2008 | Johnson et al. | |
| 7,377,223 B2 | 5/2008 | Toupin et al. | |
| 7,380,629 B2* | 6/2008 | Vaisanen | B62M 27/02 297/215.14 |
| 7,556,114 B2* | 7/2009 | Hanagan | B62J 1/28 224/430 |
| D601,453 S | 10/2009 | Brew et al. | |
| 7,753,154 B2 | 7/2010 | Maltais | |
| 7,802,644 B2 | 9/2010 | Brodeur et al. | |
| D670,602 S | 11/2012 | Lepine et al. | |
| 8,381,857 B1 | 2/2013 | Sampson et al. | |
| 8,567,546 B2 | 10/2013 | Berg et al. | |
| 8,777,531 B2 | 7/2014 | Massicotte et al. | |
| 9,027,992 B2 | 5/2015 | Kawatani et al. | |
| 9,352,801 B2* | 5/2016 | Makitalo | B62M 27/02 |
| 9,469,218 B2* | 10/2016 | Girouard | B60N 2/40 |
| D813,091 S | 3/2018 | Tharp | |
| 10,011,327 B2 | 7/2018 | Sato et al. | |
| 10,215,083 B2 | 2/2019 | Vezina et al. | |
| 10,247,938 B2 | 4/2019 | Chamuczynski | |
| 10,300,990 B2 | 5/2019 | Vezina | |
| 10,336,409 B1 | 7/2019 | Girard et al. | |
| 10,435,117 B1 | 10/2019 | Cifers et al. | |
| 10,597,105 B2 | 3/2020 | Lefebvre et al. | |
| 10,676,157 B2 | 6/2020 | Vigen | |
| 10,730,576 B2 | 8/2020 | Labbe et al. | |
| 10,744,953 B2 | 8/2020 | Labbe et al. | |
| 10,787,216 B2 | 9/2020 | Visenzi | |
| 10,822,054 B2 | 11/2020 | Lemieux | |
| 10,850,806 B2* | 12/2020 | Labbe | B62M 27/02 |
| 10,899,415 B2 | 1/2021 | Mangum et al. | |
| 2003/0131776 A1 | 7/2003 | Nakajima et al. | |
| 2003/0150658 A1 | 8/2003 | Nakano et al. | |
| 2006/0043131 A1 | 3/2006 | Graham | |
| 2006/0191728 A1 | 8/2006 | Aoshima | |
| 2010/0147916 A1* | 6/2010 | Roberts | B62J 9/12 224/408 |
| 2011/0025087 A1 | 2/2011 | Ramos | |
| 2015/0210355 A1* | 7/2015 | Labbe | B60R 9/06 224/408 |
| 2017/0327185 A1 | 11/2017 | Labbe et al. | |
| 2018/0237106 A1* | 8/2018 | Hedlund | B62M 27/02 |
| 2021/0039749 A1 | 2/2021 | Labbe et al. | |
| 2021/0188182 A1 | 6/2021 | Edwards et al. | |

OTHER PUBLICATIONS

Office Action issued in corresponding Canadian Patent Application No. 3,103,010 dated Feb. 22, 2022 (5 pages).

* cited by examiner

SYSTEM FOR ATTACHING ACCESSORIES TO A SNOWMOBILE

CROSS-REFERENCE TO RELATED APPLICATIONS

This application is a continuation of U.S. patent application Ser. No. 17/585,027 filed on Jan. 26, 2022, which is a continuation of U.S. patent application Ser. No. 16/723,834 filed on Dec. 20, 2019 (issued as U.S. Pat. No. 11,267,407). The entire disclosures of each of these applications are incorporated herein by reference.

FIELD

The present disclosure relates to a system for attaching accessories to a snowmobile.

BACKGROUND

This section provides background information related to the present disclosure, which is not necessarily prior art.

A snowmobile is a motorized vehicle designed for winter travel and recreation, for example. A snowmobile may be operated on snow and ice, and does not require a road or trail. Some snowmobiles accommodate attachment of an accessory behind the operator's seat, such as a storage container. While current systems for attaching an accessory to a snowmobile are suitable for their intended use, they are subject to improvement. The present disclosure is advantageously directed to an improved system for attaching one or more accessories to a snowmobile.

SUMMARY

This section provides a general summary of the disclosure, and is not a comprehensive disclosure of its full scope or all of its features.

The present disclosure provides for a snowmobile including: a frame including a tunnel configured to accommodate a drive track; a connector mounted to the frame over the tunnel; and a seat configured to be removably connected to the snowmobile by way of the connector.

The present disclosure further provides for a snowmobile including: a frame; a first seat supported by the frame; a connector configured to be mounted to the frame behind the first seat; and a second seat configured to be removably connected to the snowmobile behind the first seat by way of the connector when the connector is mounted to the frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
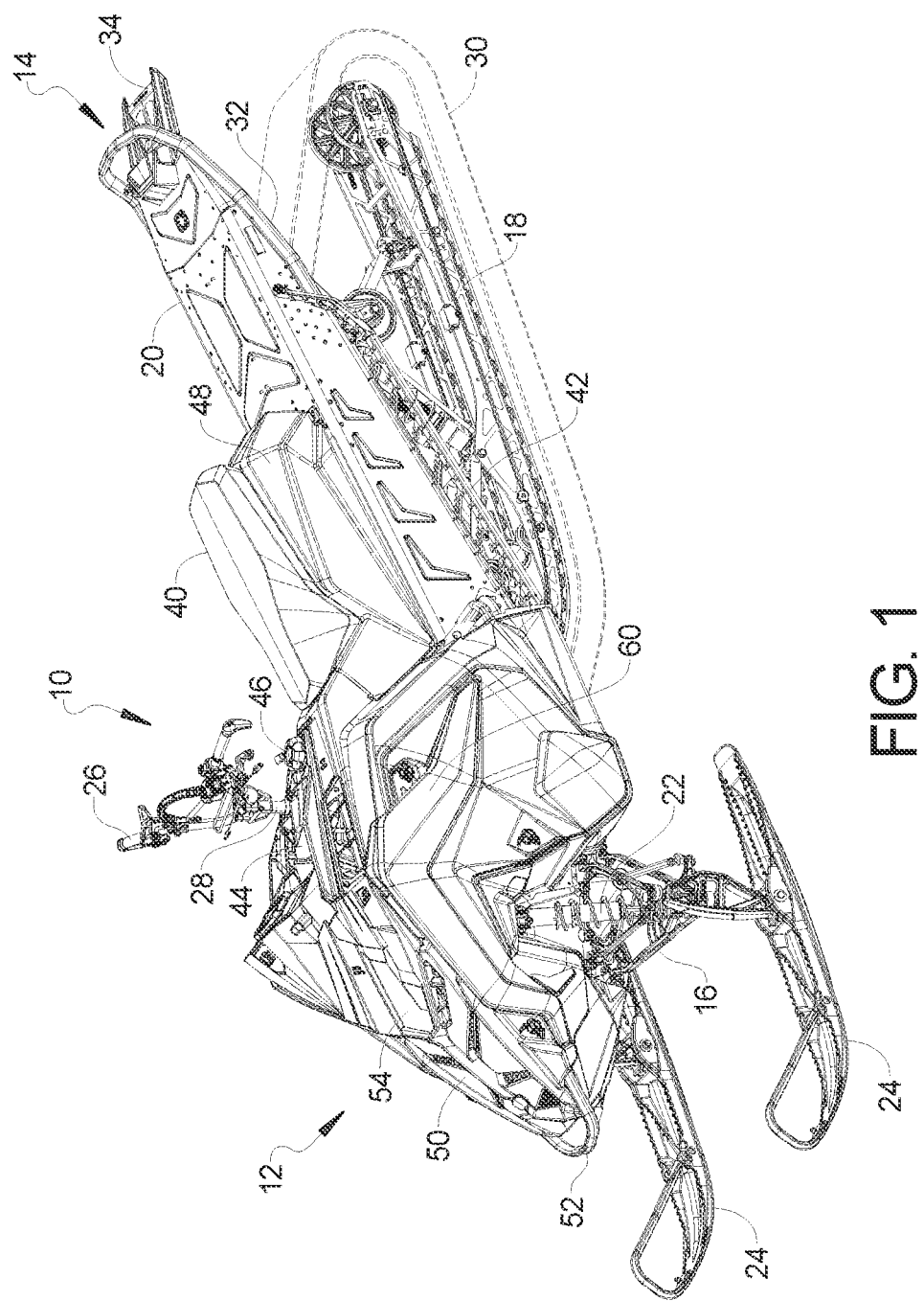
FIG. 1 is a perspective view of an exemplary snowmobile in accordance with the present disclosure.
Figure 2:
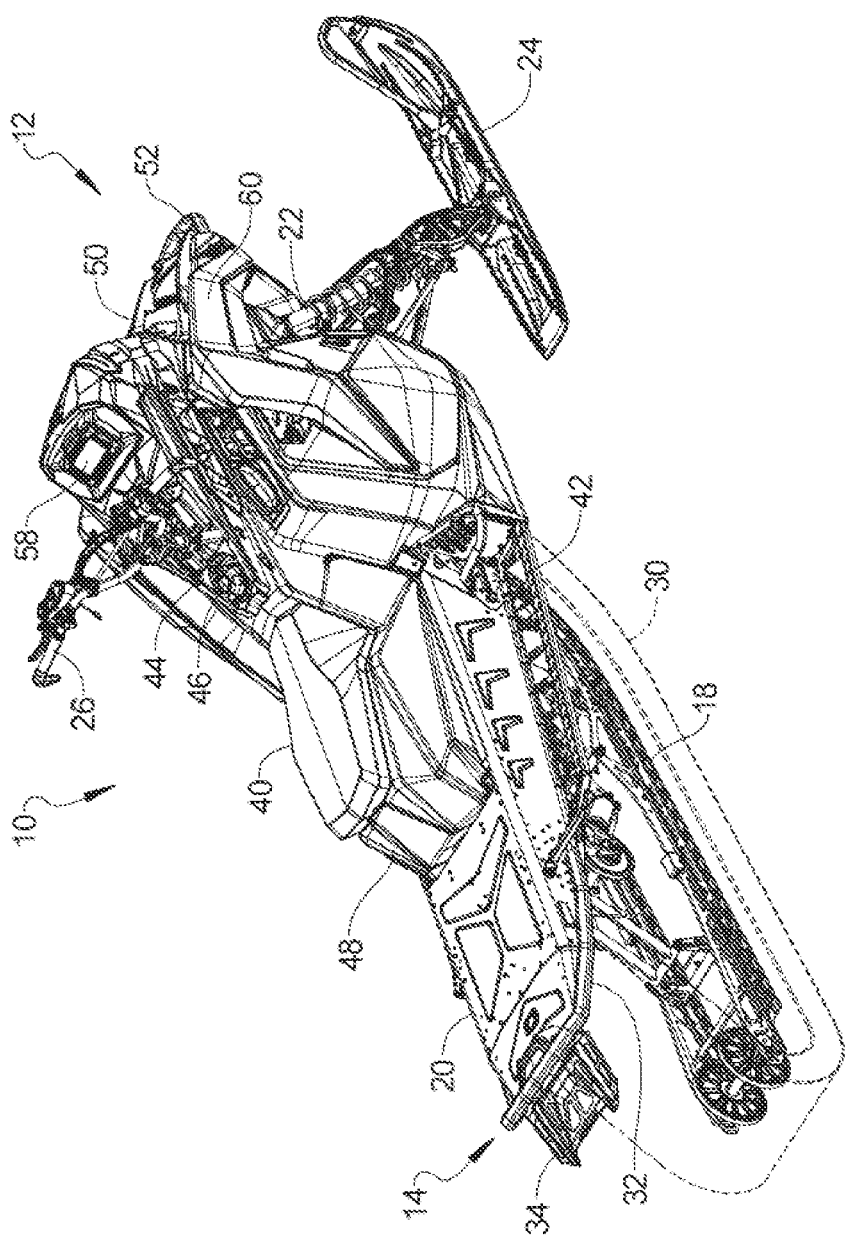
FIG. 2 is another perspective view of the snowmobile.
Figure 3:
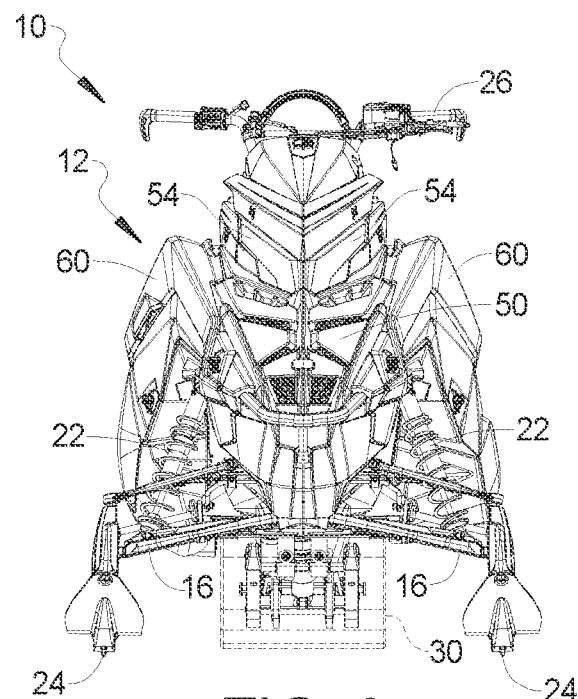
FIG. 3 is a front view of the snowmobile.
Figure 4:
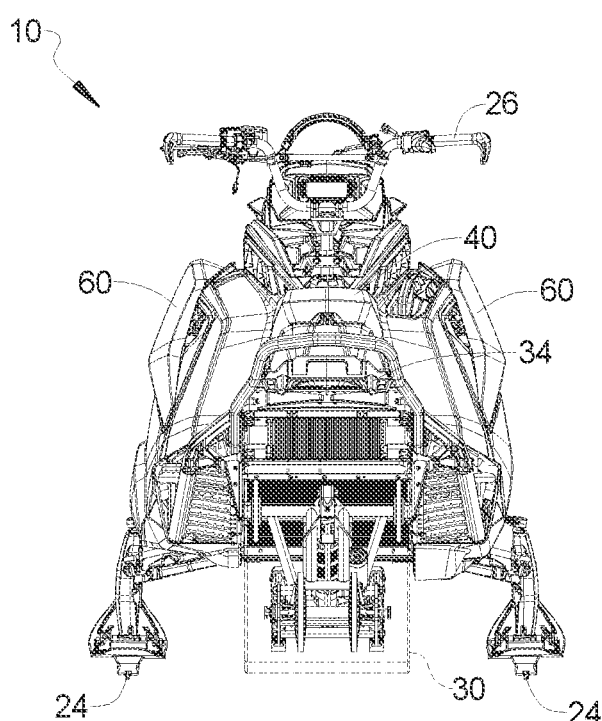
FIG. 4 is a rear view of the snowmobile.
Figure 5:
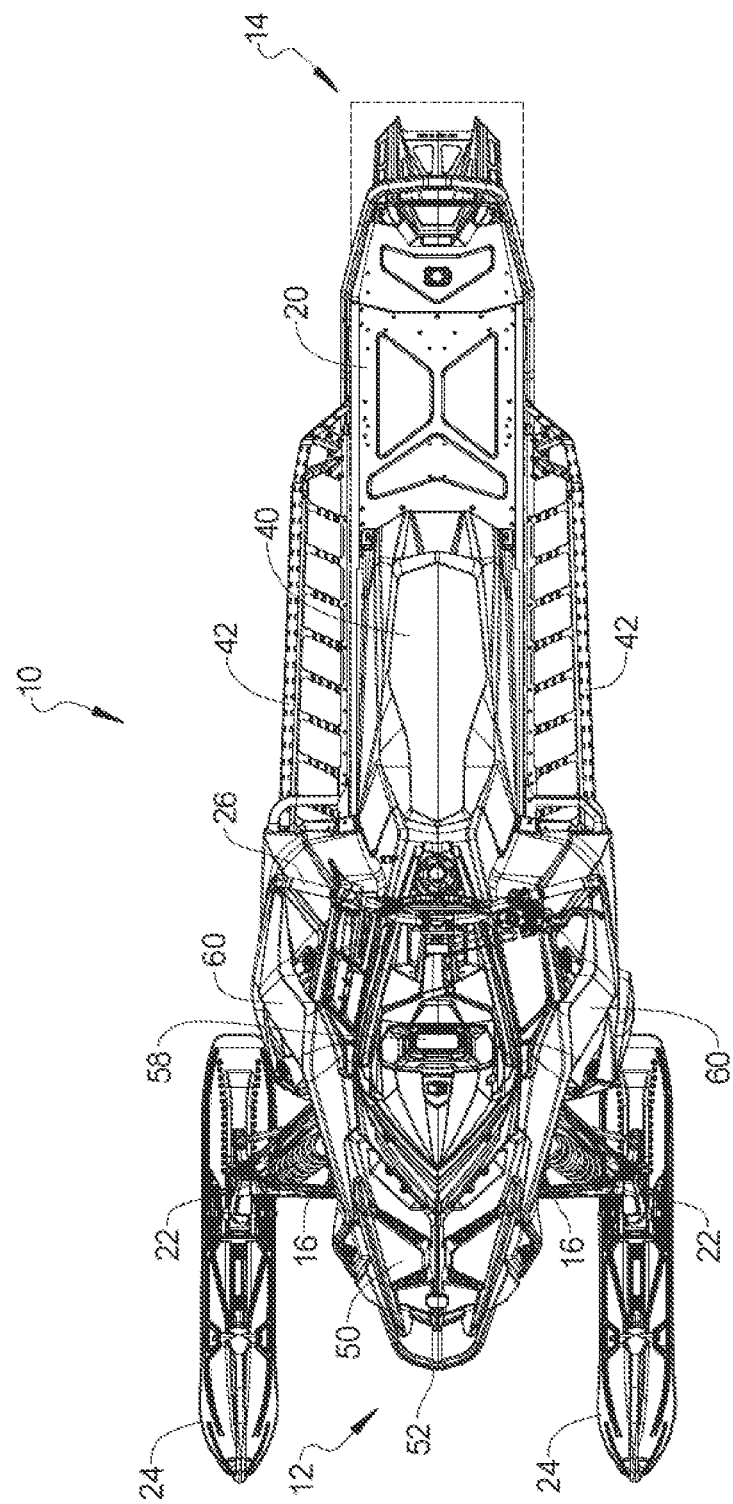
FIG. 5 is a top view of the snowmobile.

Example embodiments will now be described more fully with reference to the accompanying drawings.

With initial reference to FIGS. 1-6, an exemplary vehicle in accordance with the present disclosure is illustrated. Although the vehicle is illustrated as a snowmobile 10, numerous aspects of the present disclosure may be included with any other suitable vehicle as well. The snowmobile 10 may be any suitable type of snowmobile, such as any suitable trail snowmobile, sport trail snowmobile, touring snowmobile, performance snowmobile, utility snowmobile (such as any snowmobile suitable for search and/or rescue, law enforcement, military operations, etc.), crossover snowmobile, mountain snowmobile, youth snowmobile, etc.

The snowmobile 10 generally includes a front end 12 and a rear end 14. At the front end 12 is a front suspension 16.

At the rear end 14 is a rear suspension 18. The front suspension 16 and the rear suspension 18 support a chassis 20.

The front suspension 16 includes shock absorbers 22, each one of which is connected to a ski 24. The shock absorbers 22 may be any dampening devices suitable for absorbing shock resulting from the skis 24 passing over uneven terrain. The skis 24 are steered in part by a suitable steering device, such as handlebars 26.

Coupled to the rear suspension 18 is a belt or track 30, which is an endless or continuous belt or track 30. Rotation of the track 30 propels the snowmobile 10. The track 30 is circulated through a tunnel 32 defined at least in part by the chassis 20. The tunnel 32 may be tapered at the rear end 14. Mounted at the rear end 14 is a flap 34, which blocks snow and other debris from being "kicked-up" by the track 30.

Mounted to the chassis 20 and atop the tunnel 32 is a seat 40 for the operator of the snowmobile 10. On both sides of the chassis 20 or tunnel 32 are footrests 42, upon which the operator may rest his or her feet when seated on the seat 40. The seat 40 is positioned to allow the driver to grasp the handlebars 26 for steering the snowmobile 10. The handlebars 26 are mounted to a steering rod 28, which protrudes out from within the center console 44. At the center console 44 is a fuel cap 46 of a fuel tank 48. Any suitable accessory 36 (see FIG. 6) may be mounted to the chassis 20 behind the seat 40. Suitable accessories include, but are not limited to, one or more of the following: a storage container, a secondary seat, a fuel tank, an oil tank, a chainsaw mount, a snowboard rack, an ice auger mount, a ski mount, a gun scabbard, etc.

At the front end 12 of the snowmobile 10 is a hood assembly 50, which is mounted on top of a nose pan 68. Mounted to the hood assembly 50 and protruding from a forward most end thereof is a front bumper 52. The hood assembly 50 houses headlights 54. An optional windshield 56 is connected to an uppermost portion of the hood assembly 50. Associated with the hood assembly 50 is a display 58 viewable by the operator when seated on the seat 40. Mounted to opposite sides of the hood assembly are body panels 60, which are advantageously interchangeable.

Figure 6:
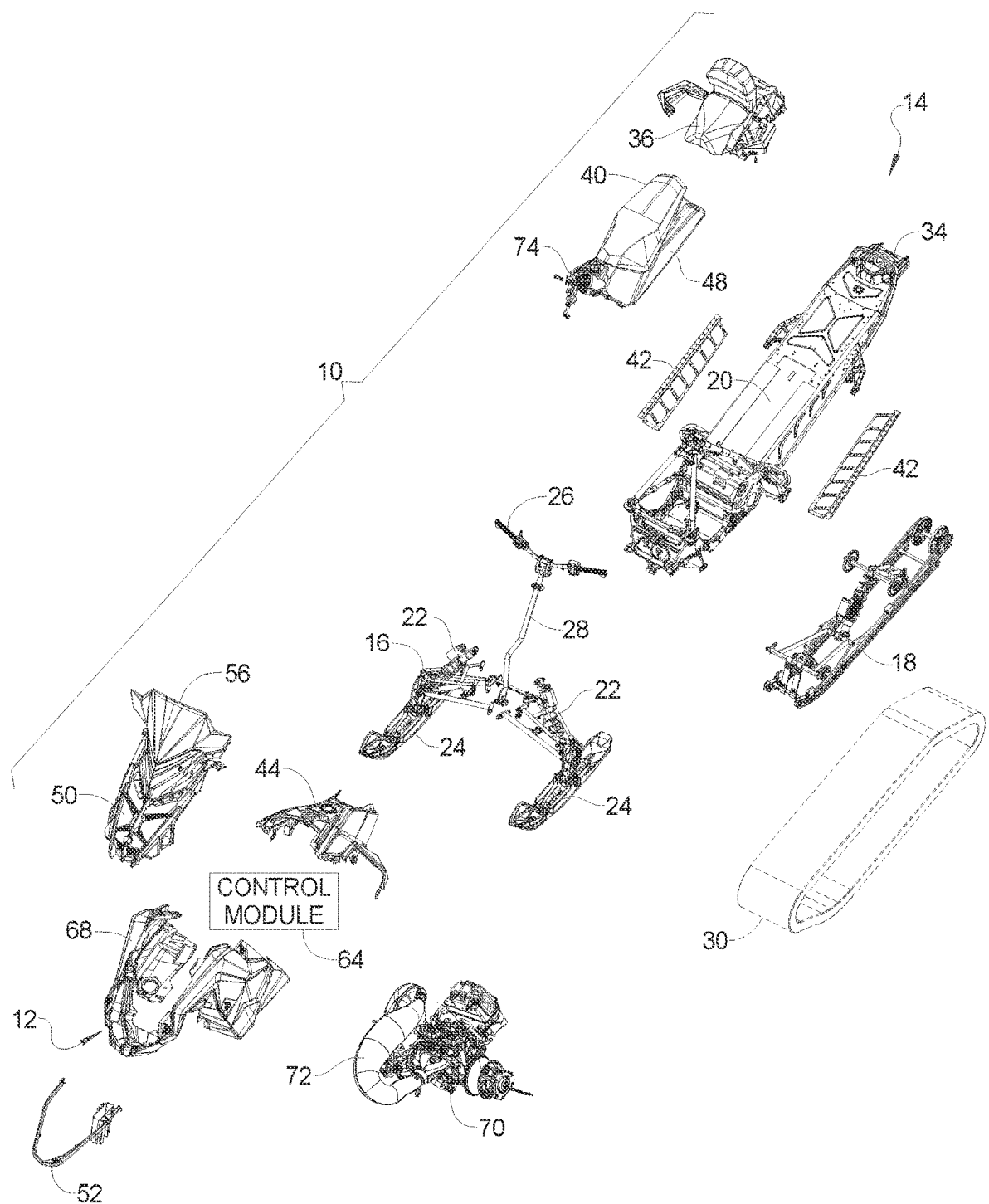
FIG. 6 is an exploded view of the snowmobile.

With particular reference to FIG. 6, the snowmobile 10 further includes an engine assembly 70. The engine assembly 70 generates power for driving the track 30. The engine assembly 70 may include any suitable engine, such as a two-stroke engine, a four-stroke engine (with or without a turbocharger), an 850 cc engine, etc. Coupled to the engine assembly 70 is any suitable exhaust assembly 72. Oil for the engine assembly 70 is stored in an oil tank assembly 74, which may be arranged proximate to the seat 40.

The snowmobile 10 further includes any suitable control module 64. The control module 64 may be arranged at any suitable location, such as within the hood assembly 50 or beneath the center console 44. More specifically, the control module 64 may be included with the display 58 or a control assembly mounted to the handlebars 26.

The term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 7:
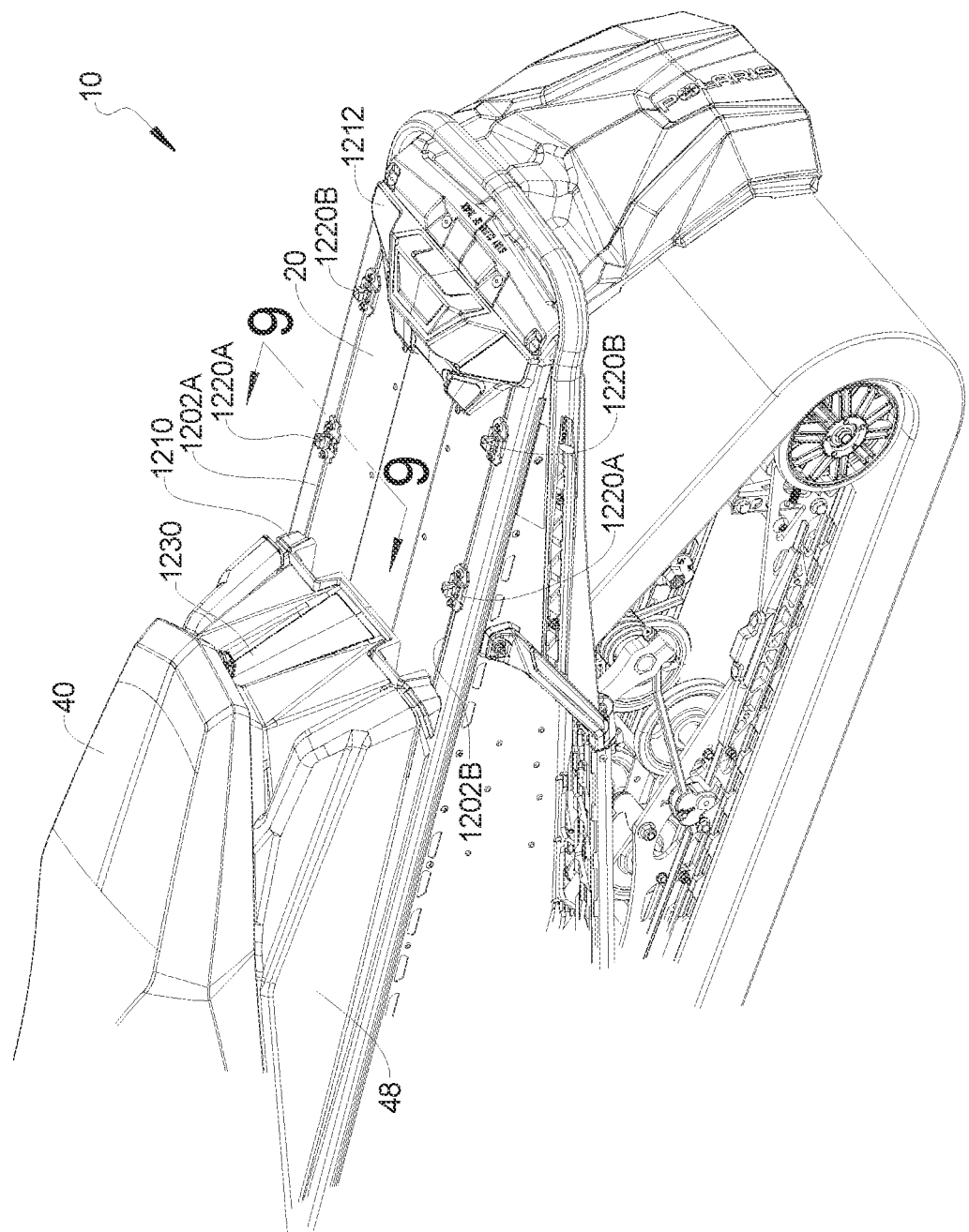
FIG. 7 is a perspective view of a rear end of the snowmobile, including a rear portion of a chassis of the snowmobile.

With reference to FIG. 7, attachment of the accessory 36 and other accessories to the rear of the chassis 20 will now be described. In FIG. 7 and many of the subsequent figures, the chassis 20 and the tunnel 32 are illustrated as not tapered, but the accessory 36 and any other suitable accessory may be attached to the tapered tunnel 32 of FIGS. 1, 2, 5 and 6 as well.

As illustrated in FIG. 7, the rear of the chassis 20 defines a pair of slots 1202A and 1202B, which extend parallel to each other. The slots 1202A and 1202B generally extend from a lower support member 1210 to a brake light assembly 1212. Mounted to the slots 1202A and 1202B is a first or forward set of mounts 1220A and a second or rear set of mounts 1220B. The mounts 1220A, 1220B are removably connected to the slots 1202A and 1202B. The slots 1202A and 1202B may include predefined mounting locations for each one of the mounts 1220A, 1220B. Alternatively, the slots 1202A, 1202B and the mounts 1220A, 1220B may be configured to permit the mounts 1220A, 1220B to be mounted at any suitable positions along the slots 1202A, 1202B. As described further herein, the mounts 1220A, 1220B are configured to couple with any suitable accessories, such as the seat accessory 36 (see FIGS. 6, 16A, 16B, 18A, 18B), or any other suitable accessories, such as those set forth herein.

Figure 8:
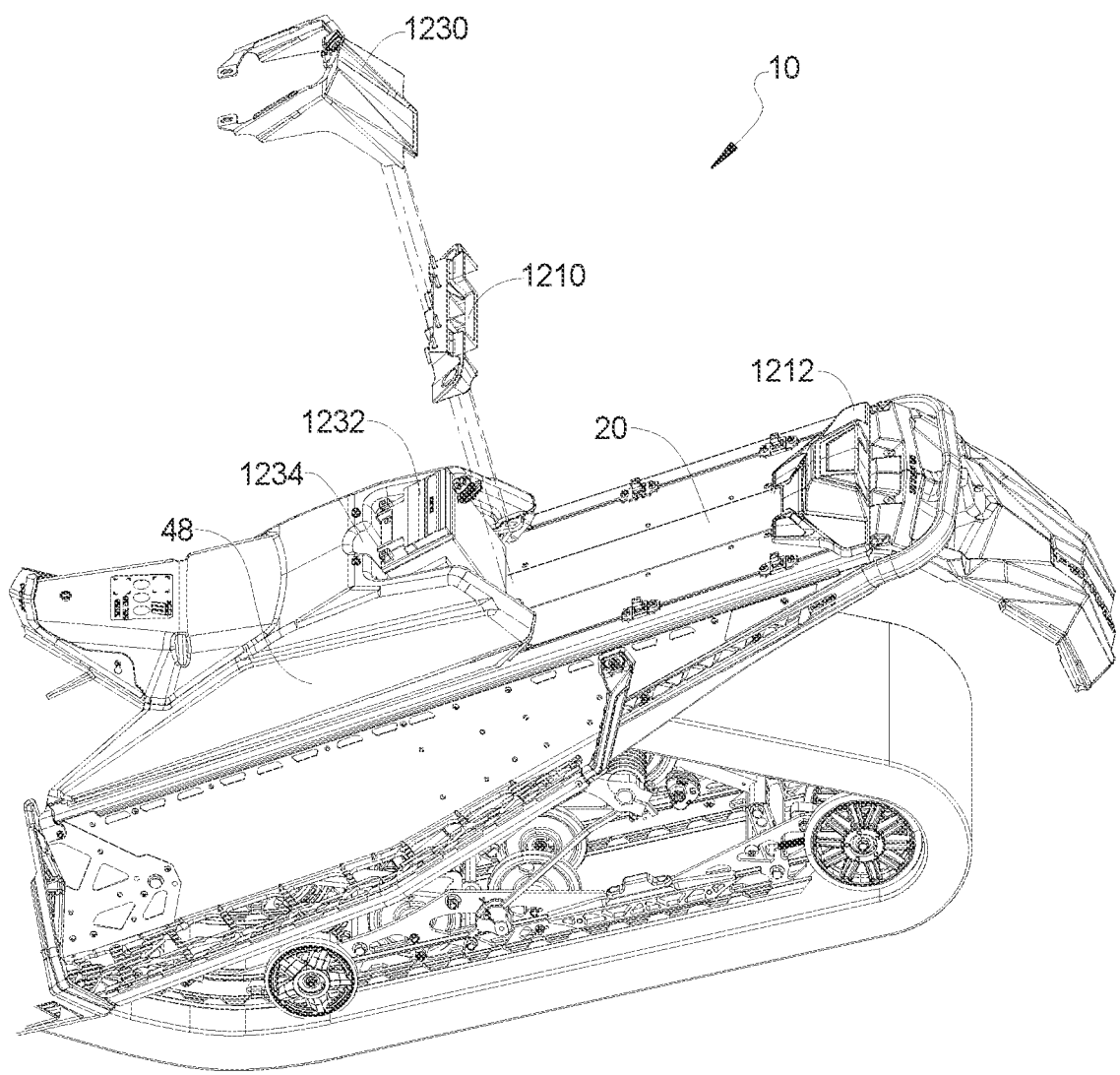
FIG. 8 is a perspective view of the snowmobile illustrating lower and upper support members exploded therefrom.

With continued reference to FIG. 7 and additional reference to FIG. 8, the lower support member 1210 is mounted to the chassis 20 beneath the fuel tank 48. The lower support member 1210 supports at least a rear end of the fuel tank 48, which is generally U-shaped. The lower support member 1210 also supports, and is in cooperation with, an upper support member 1230. Arranged on top of the upper support member 1230 is the main seat 40 for the operator. Thus, the lower support member 1210 supports the rear end of the fuel tank 48, the upper support member 1230, the seat 40 by way of the upper support member 1230, and a battery 1232 by way of the upper support member 1230.

The rear of the fuel tank 48 is open and bottomless at a center portion thereof, thereby defining a cavity 1234. The lower support member 1210 extends across the open rear of the fuel tank 48 to provide support thereto. The cavity 1234 is deeper than cavities found in fuel tanks of other snowmobiles due to the fuel tank 48 being bottomless, or open, at the middle portion of the rear end thereof. As a result, the battery 1232 may be arranged at a relatively lower and more rearward position as compared to existing snowmobiles thereby advantageously providing the snowmobile 10 with an improved center of gravity. In applications that do not include the battery 1232, the cavity 1234 advantageously provides an additional storage area, such as for an auxiliary oil bottle, gloves, etc.

Figure 9:
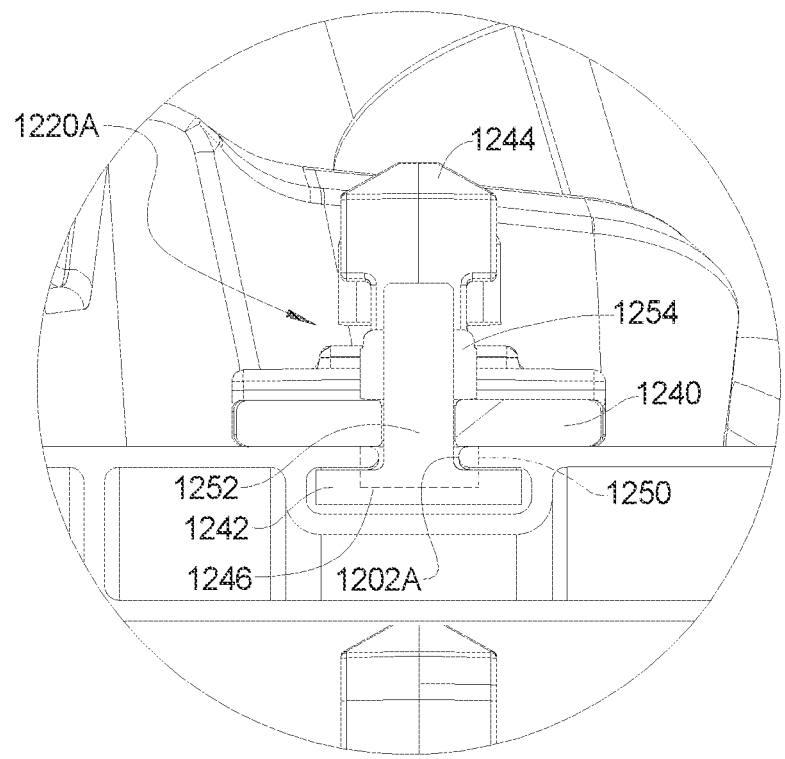
FIG. 9 is a cross-sectional view taken along line 9-9 of FIG. 7.

FIG. 9 is a cross-sectional view taken along line 9-9 of FIG. 7 illustrating cooperation between one of the mounts 1220A and the slot 1202A. Each one of the mounts 1220A, 1220B is locked to the slots 1202A, 1202B in a similar manner, and thus the following description of the mount 1220A also applies to the other mounts 1220A, 1220B. The mount 1220A includes an upper portion 1240 at an upper surface of the slot 1202A, and a lower portion 1242 at an undersurface of the slot 1202A. The upper portion 1240 includes a post 1244, which is sized and shaped to cooperate with a receptacle of the accessory 36, as well as a receptacle of any of the other accessories set forth herein. Extending downward from the upper portion 1240 is a base 1246, which is sized and shaped to be received within an aperture 1250 defined by the slot 1202A. The aperture 1250 and the base 1246 have a similar size and shape, and thus with the base 1246 seated in the aperture 1250, the mount 1220A is locked into position along the length of the slot 1202A. To further lock the mount 1220A to the slot 1202A, the lower portion 1242 is locked into cooperation with the undersurface of the slot 1202A in any suitable manner. For example, the lower portion 1242 may include a post 1252, which extends through the slot 1202A and through the upper portion 1240, where the post 1252 is threaded into cooperation with a nut 1254. As the nut 1254 is tightened, the lower portion 1242 is retained against the undersurface of the slot 1202A. The mount 1220A may include a pair of such fastening arrangements on opposite sides of the base 1246.

Figure 10A:
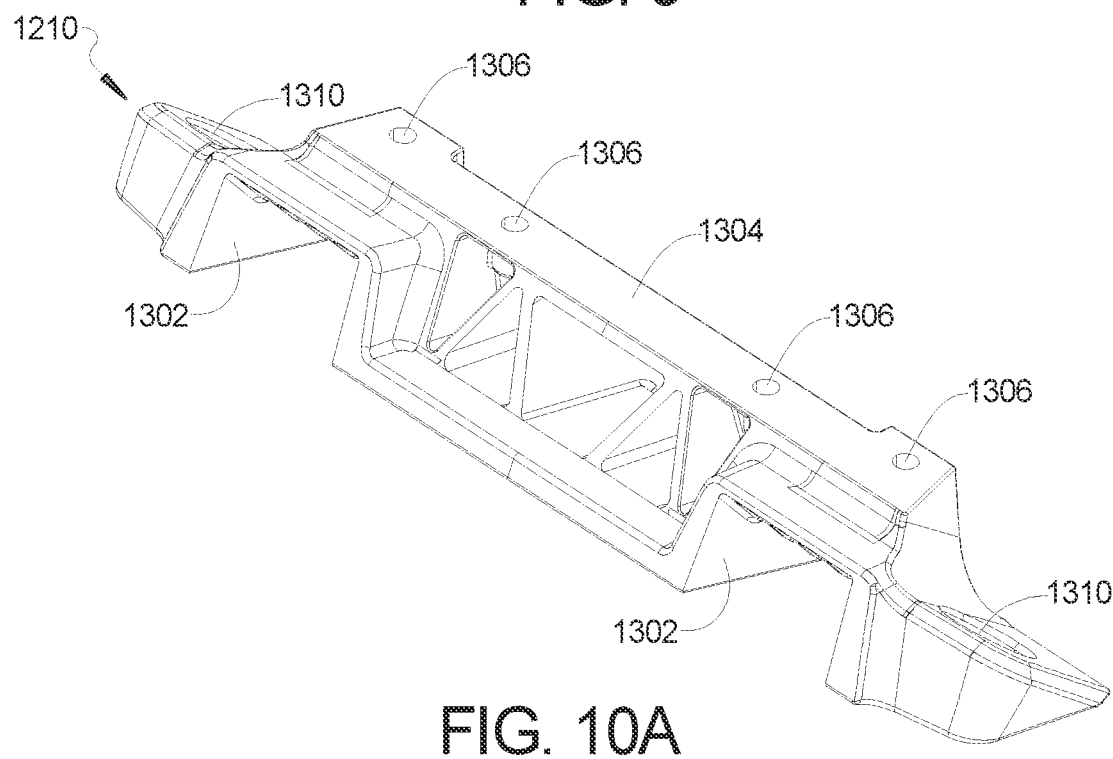
FIG. 10A is a perspective view of the lower support member.
Figure 10B:
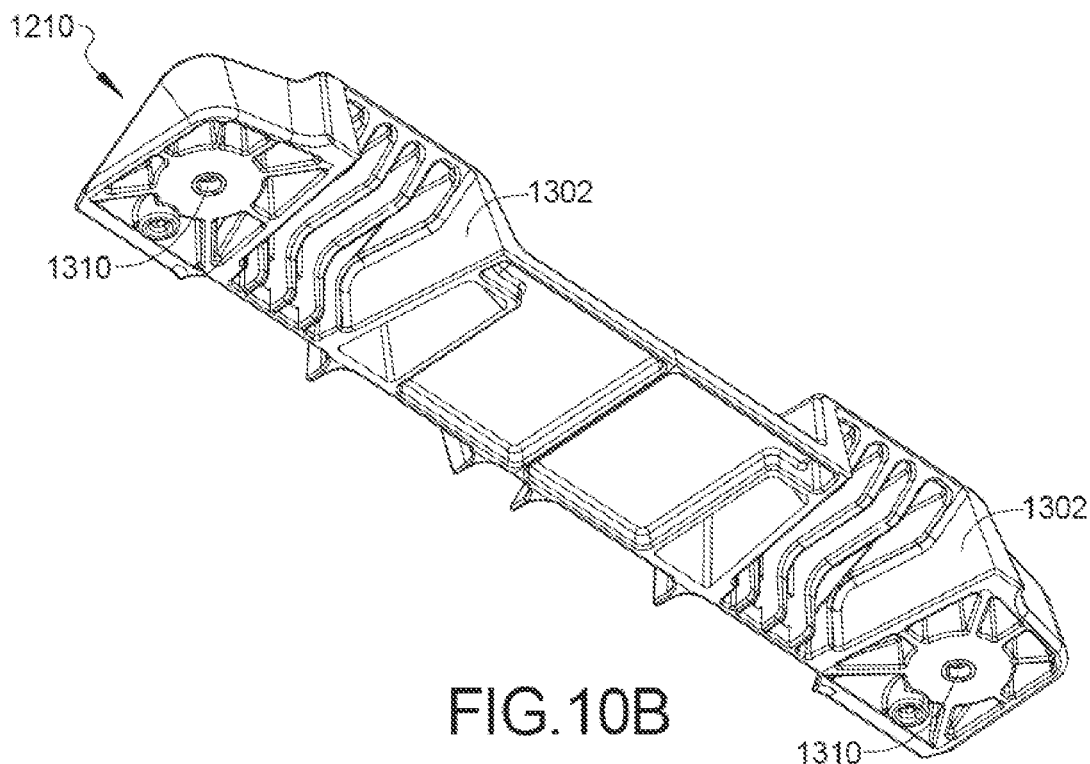
FIG. 10B is another perspective view of the lower support member.
Figure 10C:
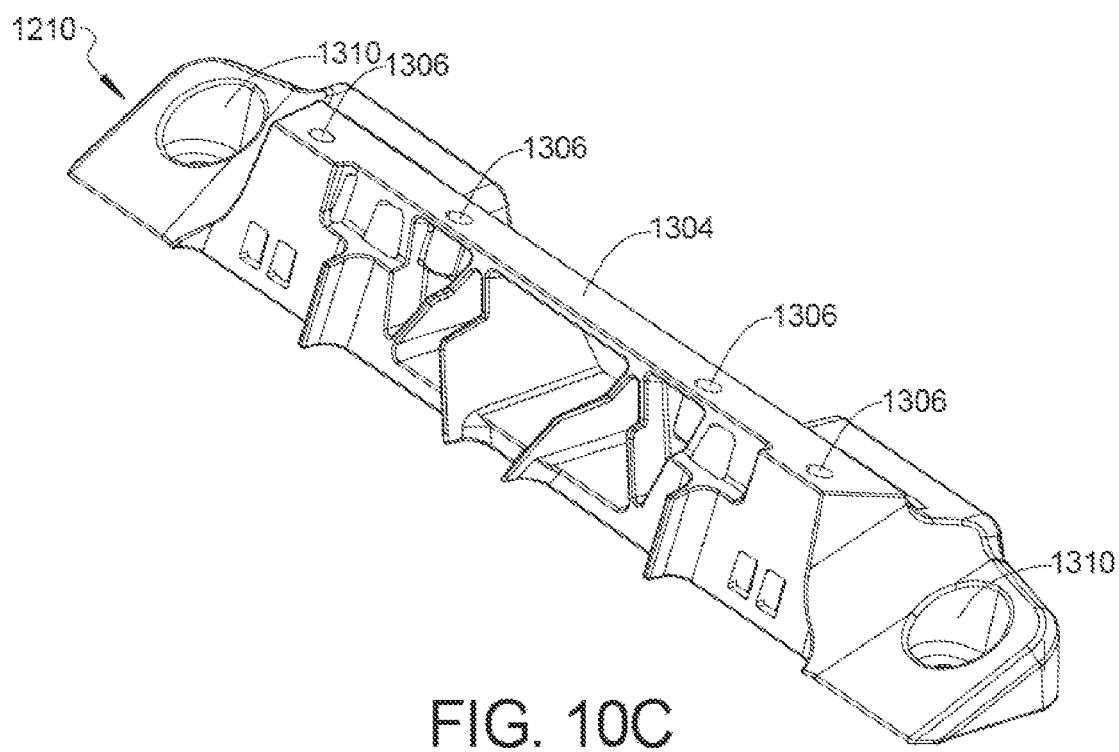
FIG. 10C is an additional perspective view of the lower support member.

With reference to FIGS. 10A, 10B, and 10C, the lower support member 1210 will now be described in detail. The lower support member 1210 defines a pair of slots 1302 at a rear end thereof. At an upper surface is a support surface 1304, which is generally planar. The support surface 1304 defines any suitable number of apertures 1306, which facilitate cooperation between the lower support member 1210 and the upper support member 1230, as described herein and generally illustrated in FIGS. 11A and 11B. The lower support member 1210 further includes receptacles 1310, which are configured to receive any suitable fastener for securing the lower support member 1210 to the chassis 20.

Figure 11A:
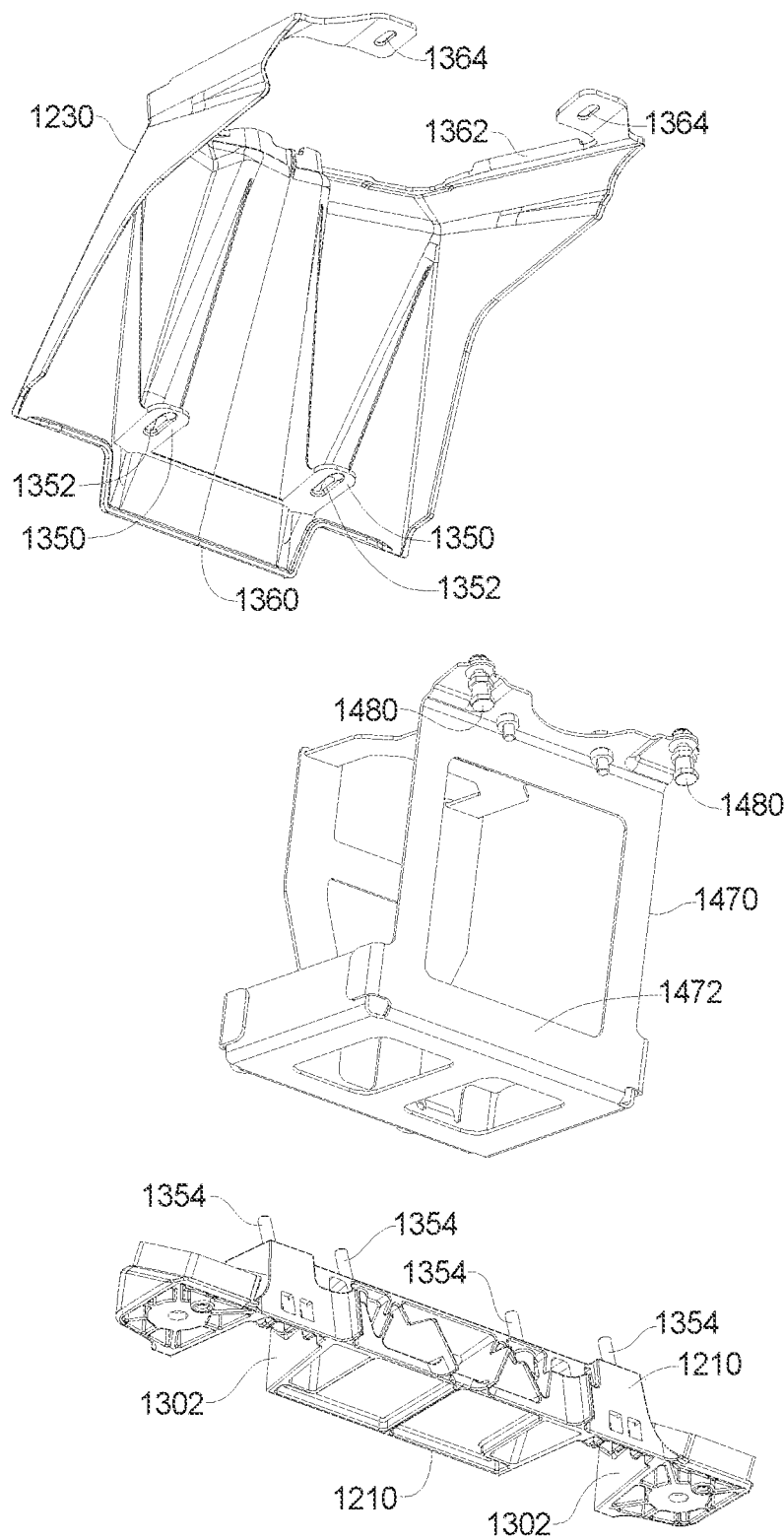
FIG. 11A is a perspective view of the upper support member, a battery mount, and the lower support member.
Figure 11B:
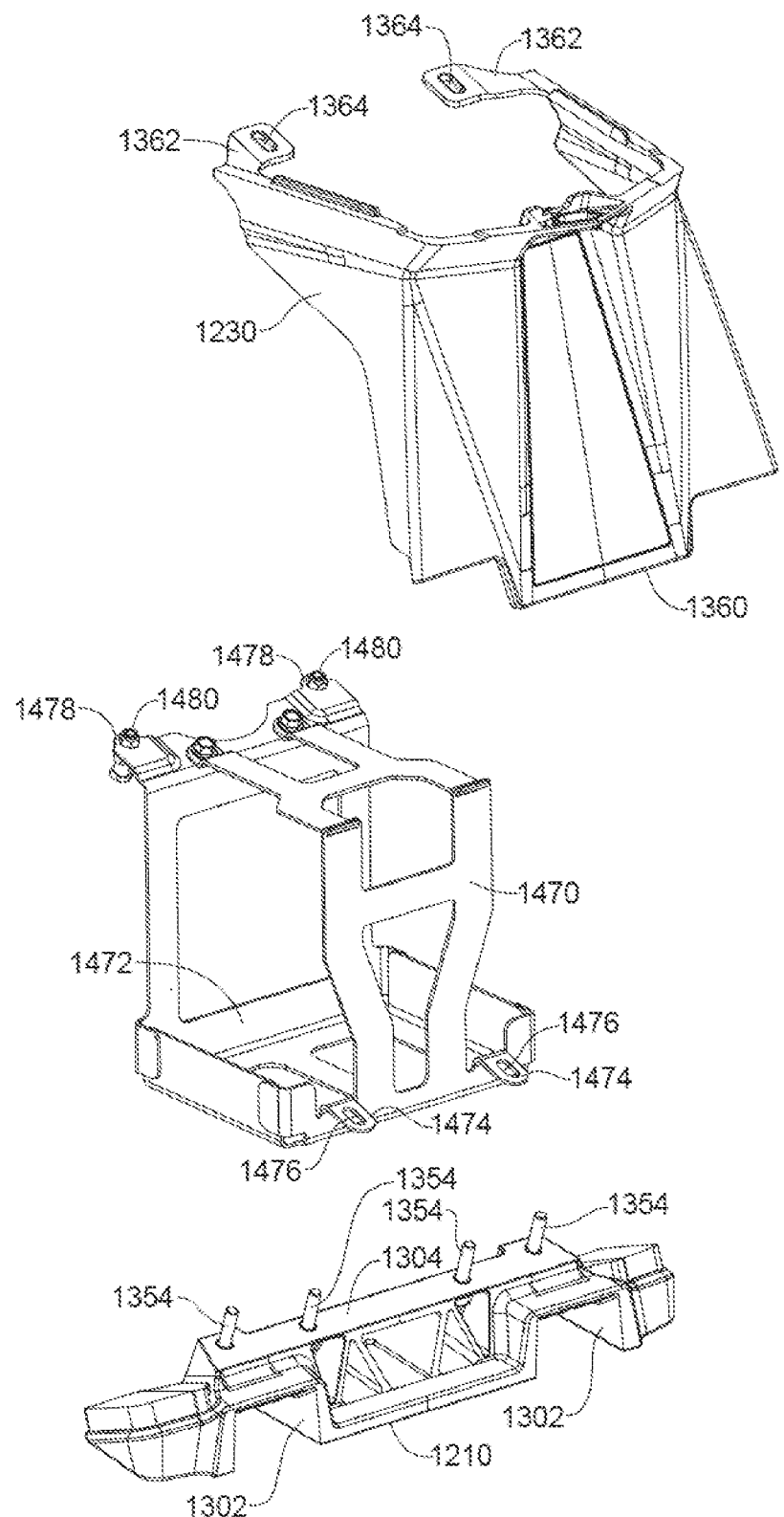
FIG. 11B is another perspective view of the upper support member, a battery mount, and the lower support member.

With additional reference to FIGS. 11A and 11B, the upper support member 1230 includes a pair of lower flanges 1350, each of which define apertures 1352 configured to receive posts 1354 extending from the apertures 1306 defined by the support surface 1304 of the lower support member 1210. The posts 1354 may be threaded, and thus a bolt may be threaded onto the posts 1354 over the flanges 1350 to secure the upper support member 1230 to the lower support member 1210. The upper support member 1230 further includes a lower flange 1360, which is sized and shaped to overlap the lower support member 1210. Opposite to the lower flange 1360 are upper flanges 1362, each of which defines apertures 1364.

A battery support 1470 may also be included. The battery support 1470 includes a frame 1472 configured in any suitable manner to support the battery 1232 therein. The battery support 1470 includes lower flanges 1474, each of which define an aperture 1476. The apertures 1476 are configured to receive the posts 1354, and the lower flanges 1474 sit on the support surface 1304 such that the battery support 1470 is at least partially supported by the lower support member 1210. At an upper portion of the battery support 1470 are upper flanges 1478 and any suitable fasteners 1480, which connect the upper flanges 1478 of the battery support 1470 to the upper flanges 1362 of the upper support member 1230.

Figure 12A:
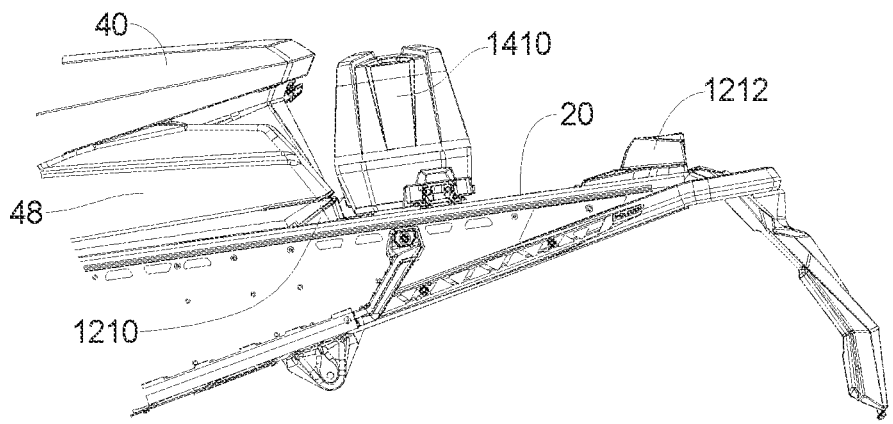
FIG. 12A is a side view of a rear of the snowmobile with a relatively tall case mounted thereto.
Figure 12B:
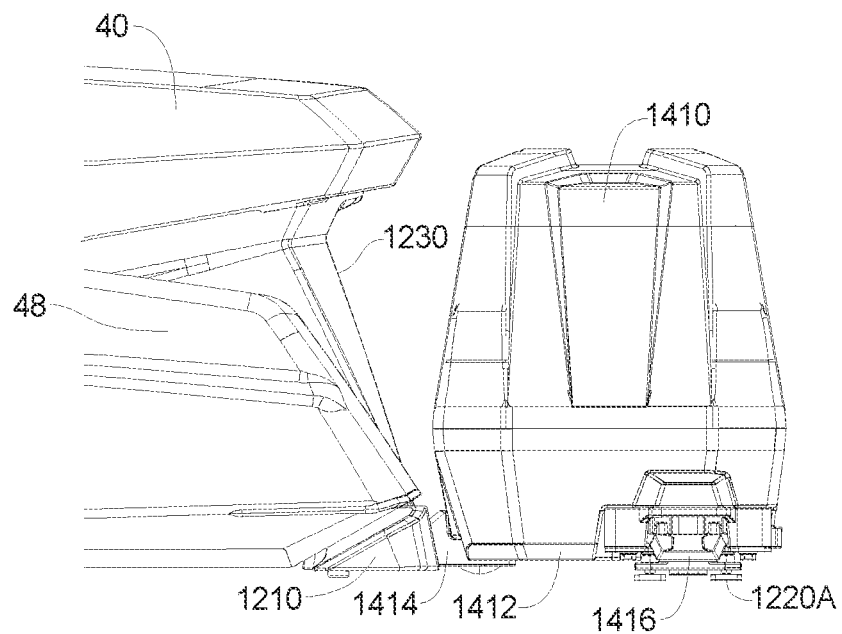
FIG. 12B is a side view illustrating cooperation between the relatively tall case and the lower support member.
Figure 12C:
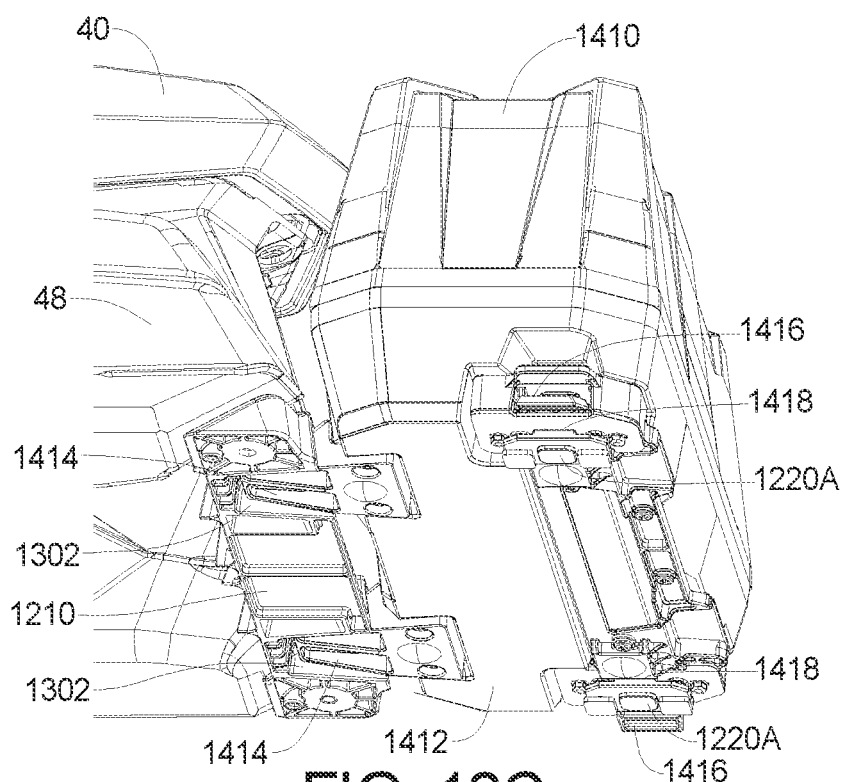
FIG. 12C is a perspective view illustrating cooperation between the relative tall case and the lower support member.

FIGS. 12A, 12B and 12C illustrate another exemplary accessory in the form of a relatively tall storage container, bag, or case 1410. The relatively tall case 1410 includes a base 1412. Extending from a front of the base 1412 are tabs 1414. Each one of the tabs 1414 is sized and shaped to be received within one of the slots 1302 of the lower support member 1210. A rear end of the base 1412 includes a pair of lock assemblies 1416, each of which defines a receptacle 1418 configured to receive one of the posts 1244 of the mounts 1220A (or 1220B). The lock assemblies 1416 may be any suitable locking assembly or device configured to lock the relatively tall case 1410 to the mounts 1220A (or 1220B).

Figure 13:
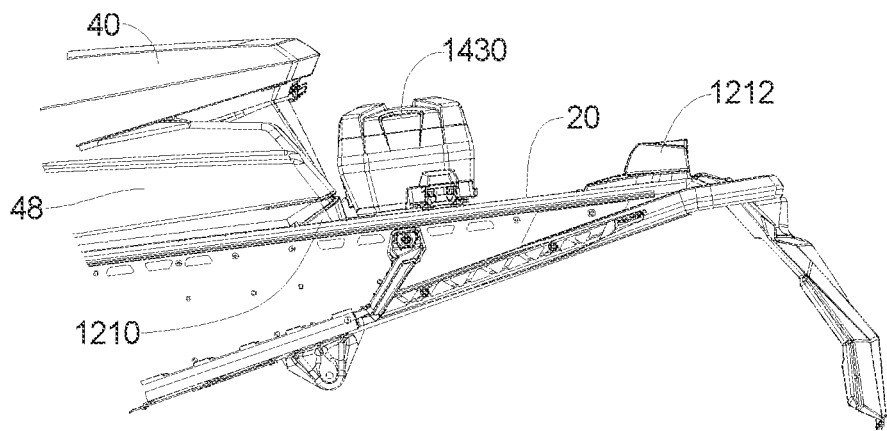
FIG. 13 is a side view of the rear of the snowmobile with a relatively short case mounted thereto.

In place of the relatively tall case 1410, any other suitable accessory may be mounted to the chassis 20 by way of the mounts 1220A, 1220B. For example, and as illustrated in FIG. 13, a relatively short case 1430 may be secured to the mounts 1220A. Like the case 1410, the case 1430 includes tabs 1414, which are inserted into the slots 1302 of the lower support member 1210. The relatively short case 1430 also includes the lock assemblies 1416, which are configured to lock to the mounts 1220A in the same manner described above with respect to the relatively tall case 1410.

Figure 14:
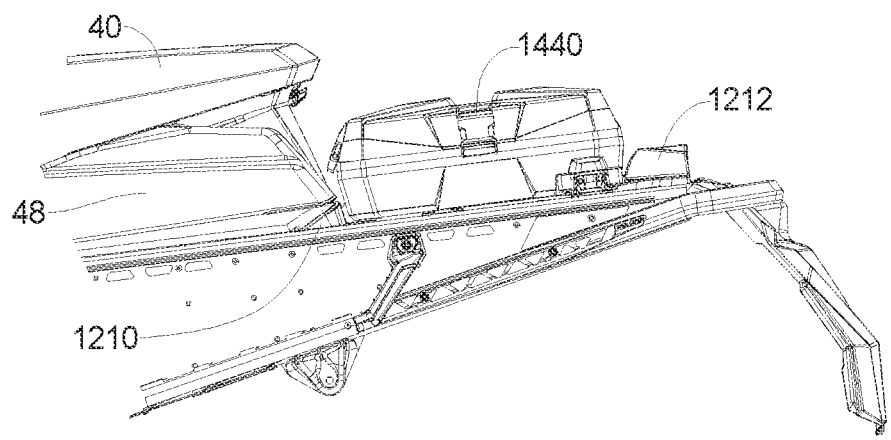
FIG. 14 is a side view of the rear of the snowmobile with a relatively short and long case mounted thereto.
Figure 15:
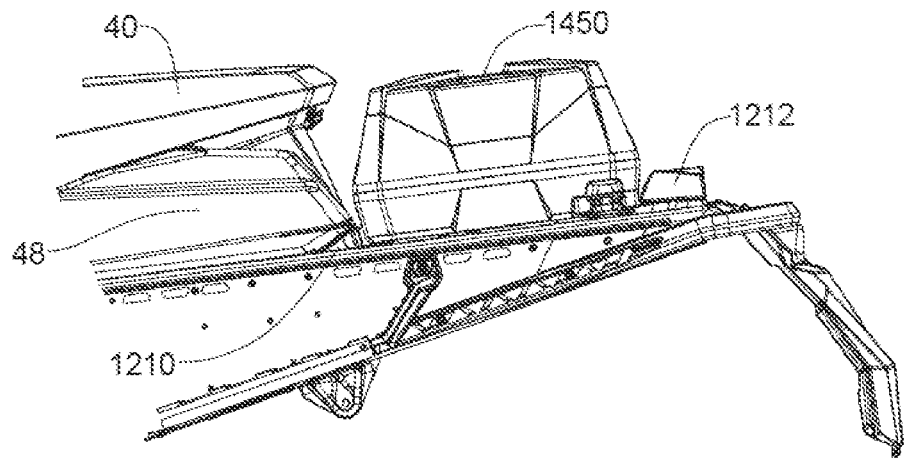
FIG. 15 is a side view of the rear of the snowmobile with a relatively tall and long case mounted thereto.

With reference to FIG. 14, a relatively long and short case 1440 may be mounted to the chassis 20. The case 1440 includes the same tabs 1414 (see FIG. 12C) of the case 1410, which are inserted into the slots 1302 of the lower support member 1210. Due to the relatively long length of the case 1440, the case 1440 cooperates with the mounts 1220B at the rear of the slots 1202A and 1202B. Specifically, the case 1440 includes the lock assemblies 1416, which are configured to lock onto the posts 1244 of the mounts 1220B to secure the case 1440 to the chassis 20. The mounts 1220A may be removed, or the case 1440 may include additional lock assemblies 1416, positioned to lock onto the mounts 1220A. As illustrated in FIG. 15, in place of the relatively long and short case 1440 may be a relatively long and tall case 1450, which is secured to the chassis 20 in the same manner described above with respect to the relatively long and short case 1440.

Figure 16A:
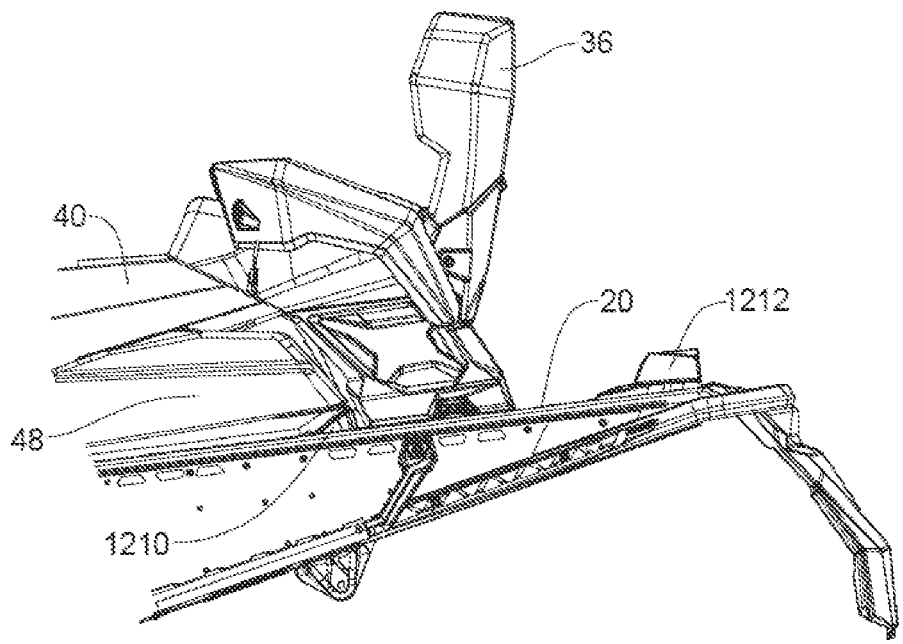
FIG. 16A is a side view of the rear of the snowmobile with a seat mounted thereto.
Figure 16B:
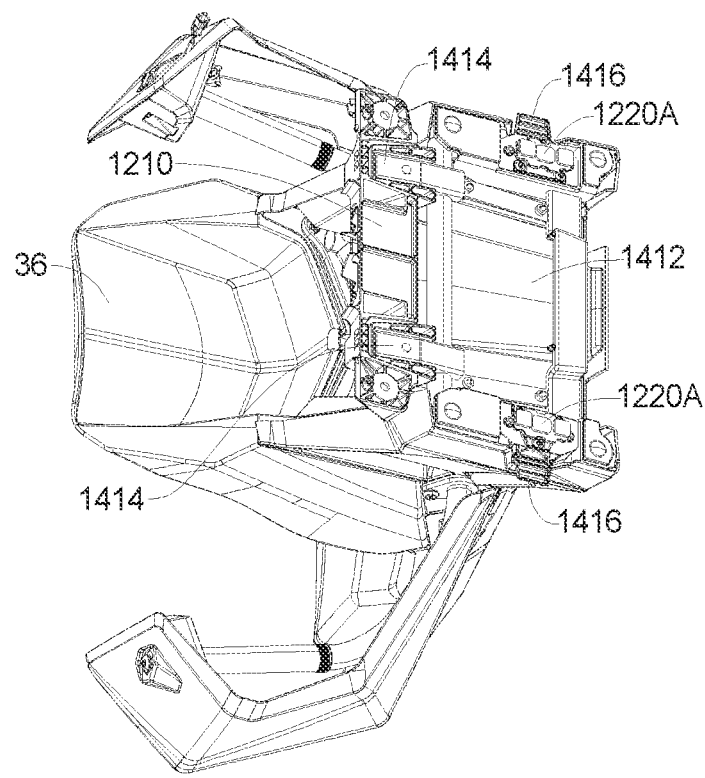
FIG. 16B is a perspective view of an undersurface of the seat of FIG. 16A illustrating cooperation between the seat and the lower support member.

FIGS. 16A and 16B illustrate the accessory as the seat 36. The seat 36 accommodates a passenger seated behind the operator. With particular reference to FIG. 16B, the seat 36 includes the tabs 1414 extending from base 1412 of the seat 36. The tabs 1414 are sized and shaped to be inserted into the slots 1302 of the lower support member 1210. The seat 36 also includes the lock assemblies 1416, each of which are configured to lock onto the mounts 1220A to secure the seat 36 to the chassis 20.

Figure 17A:
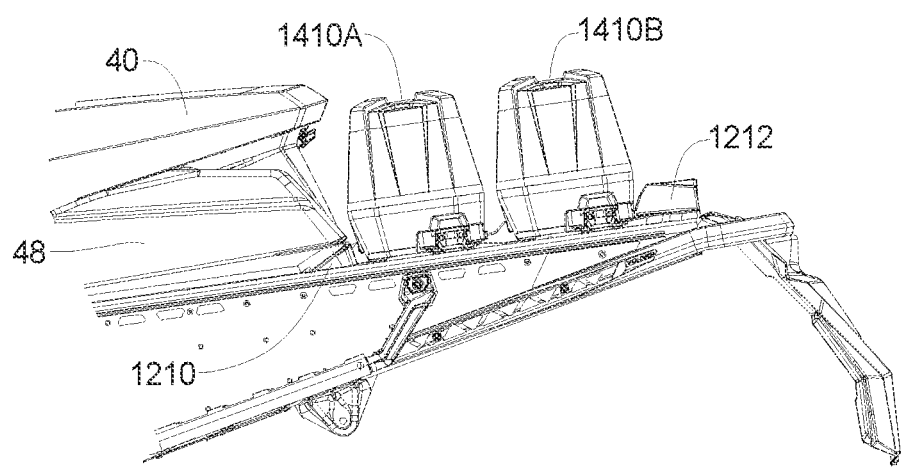
FIG. 17A is a side view of the rear of the snowmobile with two relatively tall cases mounted thereto.
Figure 17B:
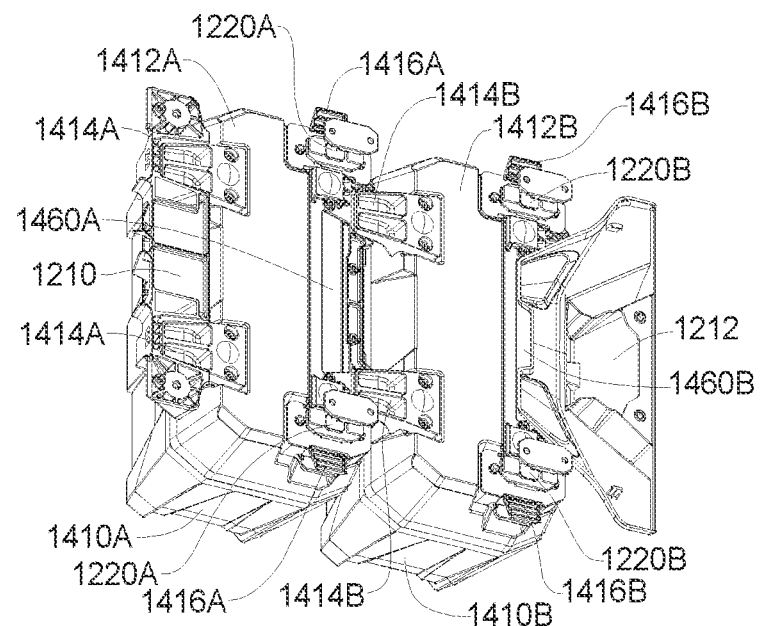
FIG. 17B is a perspective view of lower portions of the cases of FIG. 17A illustrating cooperation therebetween.

More than one accessory may be mounted to the chassis 20 behind the seat 40, such as in a "daisy chain" configuration. For example and as illustrated in FIGS. 17A and 17B, a first relatively tall case 1410A and a second relatively tall case 1410B may be daisy chained together behind the seat 40. Each one of the cases 1410A and 1410B is the same as the case 1410 described above. Thus, the same reference numerals used to illustrate and describe the case 1410 are used to illustrate and describe the cases 1410A and 1410B, but the features of the case 1410A include the suffix "A" and the features of the case 1410B include the suffix "B".

The tabs 1414A of the first case 1410A are inserted into the slots 1302 of the lower support member 1210. The lock assemblies 1416A lock onto the mounts 1220A to secure the first relatively tall case 1410 to the chassis 20. The tabs 1414B of the second case 1410B are inserted beneath the base 1412A of the case 1410A into a recess 1460A defined at a rear of the base 1412A. The recess 1460A is sized and shaped to receive the tabs 1414B beneath the base 1412A.

With respect to the second case 1410B, the lock assemblies 1416B are locked to the mounts 1220B to lock the second case 1410B to the chassis 20. The base 1412B defines a recess 1460B, which sized and shaped to receive the brake light assembly 1212 beneath the second case 1410B. In this manner, two accessories, such as the first and second relatively tall cases 1410A and 1410B, are both secured to the chassis 20 and are in cooperation with each other in a daisy chain manner. Any of the other accessories of the present disclosure may be connected to the chassis 20 in a similar daisy chain manner, except for the relatively long accessories that are long enough to extend all the way from the lower support member 1210 to the brake light assembly 1212, such as the cases 1440 and 1450.

Figure 18A:
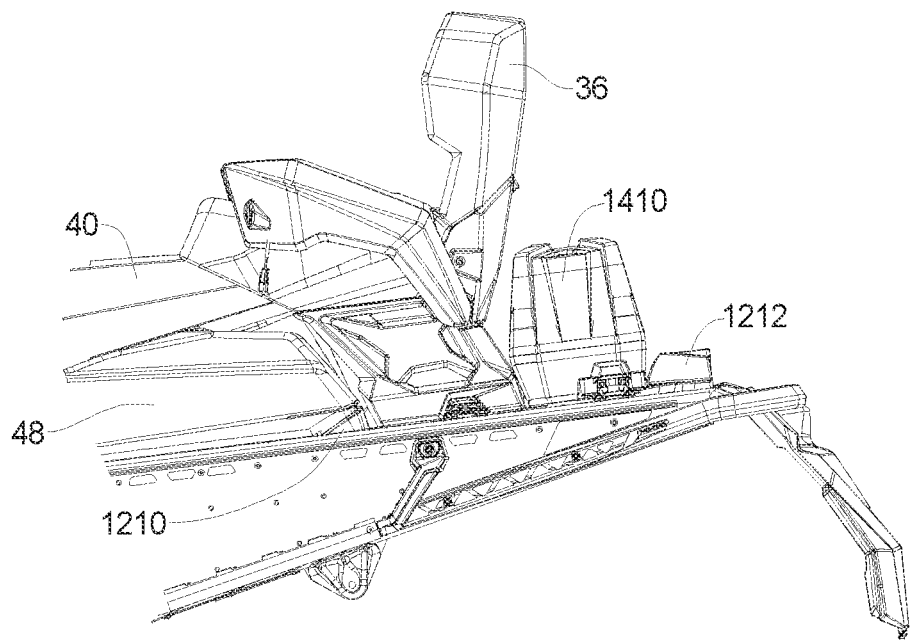
FIG. 18A is a side view of the rear of the snowmobile with the seat mounted thereto, and a relatively tall case mounted behind the seat.
Figure 18B:
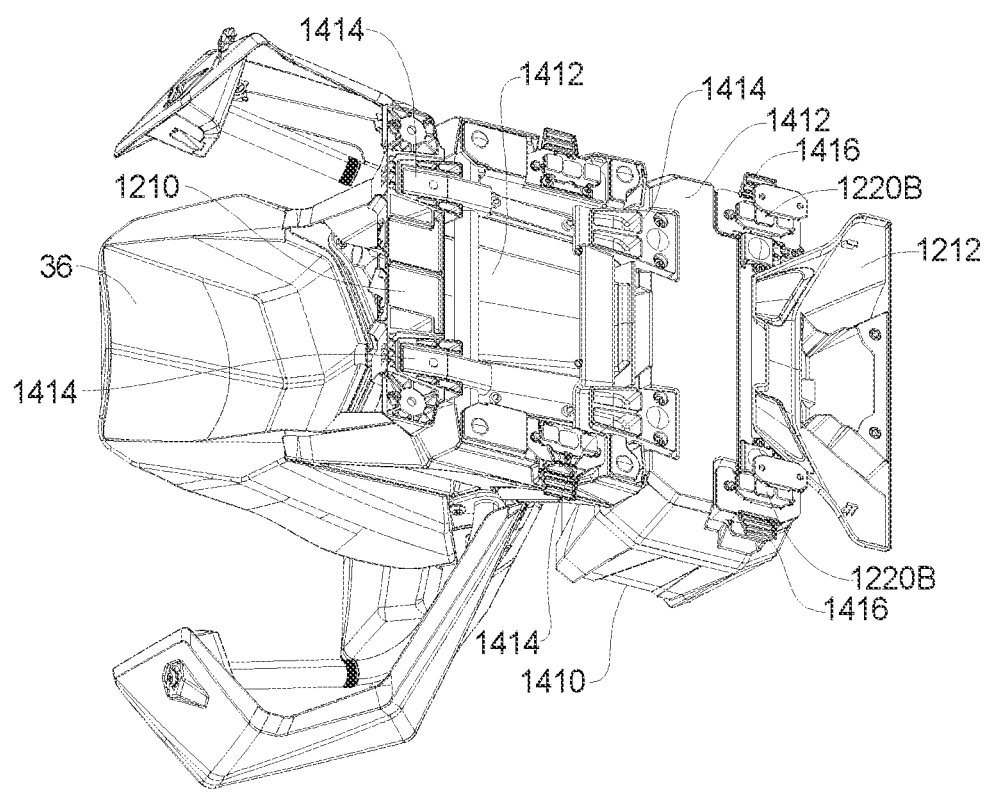
FIG. 18B is a perspective view of the bottom of the seat and the relatively tall case of FIG. 18A, and cooperation therebetween.

With reference to FIGS. 18A and 18B, different ones of the accessories may be daisy chained together. For example, the seat 36 and the case 1410 may be both secured to the chassis 20 in a daisy chain manner. With particular reference to FIG. 18B, the tabs 1414 of the seat 36 are inserted into the slots 1302 of the lower support member 1210 and the lock assemblies 1416 are locked onto the mounts 1220A in the same manner described above in the description of FIGS. 16A and 16B. The case 1410 is mounted to the chassis 20 by inserting the tabs 1414 of the case 1410 under a recess 1460 at the base 1412 of the seat 36, and the lock assemblies 1416 of the case 1410 are locked onto the mounts 1220B.

One skilled in the art will appreciate that the accessories 36, 1410, 1430, 1440, and 1450 are merely exemplary accessories. The present disclosure is also applicable to any other accessories suitable for mounting to the chassis 20, such as a fuel tank, oil tank, etc., which may be mounted alone or in a daisy chain manner as described above. The present disclosure thus advantageously provides an improved system for attaching one or more accessories to the snowmobile 10 behind the seat 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A snowmobile comprising:
   a frame including a tunnel configured to accommodate a drive track, the frame having frame length extending along a longitudinal axis of the snowmobile, and a frame width extending along a lateral axis of the snowmobile;
   a driver's seat supported by the frame;
   an accessory mounting surface defined by the frame over the tunnel at a location rearward of the driver's seat, the accessory mounting surface defining a first accessory mounting slot and a second accessory mounting slot, the first and second accessory mounting slots being parallel and having slot lengths that extend along the longitudinal axis, the first and second accessory mounting slots being separated from one another along the lateral axis;
   a first accessory mounting post secured to the frame at the first accessory mounting slot and a second accessory mounting post secured to the frame at the second accessory mounting slot, the first and second accessory mounting posts projecting upwardly from the accessory mounting surface;

first and second tab receiving slots positioned forwardly with respect to the first and second accessory mounting slots, the first and second tab receiving slots being separated from one another along the lateral axis; and an accessory configured to be removably connected to the snowmobile behind the driver's seat, the accessory including forwardly projecting first and second mounting tabs at a front side of the accessory, the accessory also including first and second lock assemblies respectively at the left and right sides of the accessory, the first and second lock assemblies each defining a receptacle at a bottom side of the accessory, wherein when the accessory is mounted to the accessory mounting surface the first and second mounting tabs are respectively received within the first and second tab-receiving slots and the first and second accessory mounting posts are locked within the receptacles of the first and second lock assemblies.

2. The snowmobile of claim 1, wherein the accessory is a passenger's seat comprising handles and a backrest.

3. The snowmobile of claim 1, wherein the accessory overlaps a fuel tank of the snowmobile when the accessory is connected to the snowmobile.

4. The snowmobile of claim 1, wherein the accessory overlaps a battery of the snowmobile when the accessory is connected to the snowmobile.

5. The snowmobile of claim 1, further comprising a third accessory mounting post that mounts at the first accessory mounting slot and a fourth accessory mounting post that mounts at the second accessory mounting slot, the third and fourth accessory mounting posts being configured for mounting a second accessory.

6. The snowmobile of claim 1, wherein the accessory overlaps the driver's seat when the accessory is connected to the snowmobile.

7. A snowmobile comprising:
a frame;
a driver's seat supported by the frame;
an accessory mounting surface mounted to the frame behind the driver's seat, the accessory mounting surface defining a first accessory mounting slot and a second accessory mounting slot, the first and second accessory mounting slots being parallel and having slot lengths that extend along the longitudinal axis, the first and second accessory mounting slots being separated from one another along the lateral axis;
a first accessory mounting post secured to the frame at the first accessory mounting slot and a second accessory mounting post secured to the frame at the second accessory mounting slot, the first and second accessory mounting posts projecting upwardly from the accessory mounting surface;

first and second tab receiving slots positioned forwardly with respect to the first and second accessory mounting slots, the first and second tab receiving slots being separated from one another along the lateral axis; and an accessory configured to be removably connected to the snowmobile behind the driver's seat the accessory including forwardly projecting first and second mounting tabs at a front side of the accessory, the accessory also including first and second lock assemblies respectively at the left and right sides of the accessory, the first and second lock assemblies each defining a receptacle at a bottom side of the accessory, wherein when the accessory is mounted to the accessory mounting surface the first and second mounting tabs are respectively received within the first and second tab-receiving slots and the first and second accessory mounting posts are locked within the receptacles of the first and second lock assemblies.

8. The snowmobile of claim 7, wherein the snowmobile includes skis connected to the frame.

9. The snowmobile of claim 7, wherein:
the frame includes a tunnel; and
the accessory mounting surface is configured to be mounted to the tunnel.

10. The snowmobile of claim 7, wherein an uppermost portion of the accessory mounting surface is vertically lower than the driver's seat.

11. The snowmobile of claim 7, wherein the accessory overlaps the driver's seat when the accessory is connected to the snowmobile.

12. The snowmobile of claim 7, wherein the accessory overlaps a fuel tank of the snowmobile when the accessory is connected to the snowmobile.

13. The snowmobile of claim 7, wherein the accessory overlaps a battery of the snowmobile when the accessory is connected to the snowmobile.

14. The snowmobile of claim 7, wherein the accessory is a passenger's seat comprising handles and a backrest.

15. The snowmobile of claim 7, further comprising a third accessory mounting post that mounts at the first accessory mounting slot and a fourth accessory mounting post that mounts at the second accessory mounting slot, the third and fourth accessory mounting posts being configured for mounting a second accessory.

16. The snowmobile of claim 1, wherein the accessory is at least one of a fuel tank, an oil tank, a chainsaw mount, a snowboard rack, an ice auger mount, a ski mount, a gun scabbard, or a storage container.

17. The snowmobile of claim 7, wherein the accessory is at least one of a fuel tank, an oil tank, a chainsaw mount, a snowboard rack, an ice auger mount, a ski mount, a gun scabbard, or a storage container.

* * * * *